United States Patent [19]

Sauer et al.

[11] Patent Number: 5,530,310
[45] Date of Patent: Jun. 25, 1996

[54] SQUIRREL-CAGE ROTOR OF AN ELECTRIC MACHINE

[75] Inventors: Bernd Sauer; Heinz Boehm, both of Berlin; Egbert Scharstein, Nuernberg, all of Germany

[73] Assignees: AEG Schienenfahrzeuge GmbH, Hennigsdorf; Siemens Aktiengesellschaft, Munich, both of Germany

[21] Appl. No.: 295,822

[22] PCT Filed: Jun. 5, 1993

[86] PCT No.: PCT/EP93/01429

§ 371 Date: Sep. 2, 1994

§ 102(e) Date: Sep. 2, 1994

[87] PCT Pub. No.: WO94/01918

PCT Pub. Date: Jan. 20, 1994

[30] Foreign Application Priority Data

Jul. 2, 1992 [DE] Germany ............ 42 21 953.1

[51] Int. Cl.$^6$ ................................ H02K 17/16
[52] U.S. Cl. ................... 310/211; 310/197; 310/225
[58] Field of Search ...................... 310/211, 212, 310/182, 183, 197, 225, 196, 270, 261

[56] References Cited

U.S. PATENT DOCUMENTS 1,096,243  5/1914  Hoock .
4,937,486  6/1990  Schwanda .................. 310/197

FOREIGN PATENT DOCUMENTS

| 271011 | 3/1914 | Germany . |
| 314651 | 9/1919 | Germany ............ 310/212 |
| 555837 | 8/1932 | Germany . |
| 150579 | 9/1920 | United Kingdom . |
| 546862 | 8/1942 | United Kingdom .......... 310/212 |

OTHER PUBLICATIONS

ETZ–Archive, vol. 6 (1984), issue 5, pp. 165–172, "Drehschwingungsbeanspruchung der Käfigwicklung bei Induktionsmaschinen".

Primary Examiner—R. Skudy
Attorney, Agent, or Firm—Spencer & Frank

[57] ABSTRACT

For a squirrel-cage rotor of an electric machine, having a cage that passes through the stack axially and is made of electrically well-conductive short-circuit rods that are connected by short-circuit rings at the ends projecting from the stack, oscillation problems that result during operation with frequency converters are intended to be solved. In addition, higher natural torsion frequencies are intended to be achieved on the rotor, that is, the construction is to be made less sensitive by simple modifications to the squirrel cage in order to prevent the resonance effects. This object is attained in that respectively two, three or more short-circuit rods are guided together to rod assemblies at their ends, and these are connected to the short-circuit rings with material-to-material bonding.

10 Claims, 2 Drawing Sheets

SQUIRREL-CAGE ROTOR OF AN ELECTRIC MACHINE

BACKGROUND OF THE INVENTION

The invention relates to a squirrel-cage rotor of an electric machine having a cage that passes through a stack axially and is made of electrically conductive rotor bars connected by short-circuit rings at the ends projecting from the stack.

In larger three-phase motors operated with frequency converters with varying rpm, e.g. in electric motor vehicles and locomotives, but also in other applications, the generally conventional construction of the rotor leads to problems. In the standard configuration as a cage rotor, the tubular stack comprises magnetic lamina layered on the rotor shaft to prevent eddy currents, wherein grooves cut into the outer diameter of the lamina receive short-circuit copper rods (i.e., rotor bars). At the end of the stack, the rotor bars project beyond the lamina and are connected there to end-side short-circuit rings by a welded or soldered connection. The rotor bars disposed in the sheet grooves and the short-circuit rings secured at the end form the cage. For electrical-related reasons, the short-circuit rods generally have a greater expansion in the radial direction than in width. The rods projecting beyond the stack thus have less flexural strength in the tangential direction of the rotor than in the radial direction. The short-circuit ring connected with material-to-material bonding to the rods is oscillatory in the tangential direction with respect to the stack because of the softness of the short-circuit rods. When considered alone, the rotor can be viewed as a rotational oscillation system comprising three masses. The stack forms the central, large mass on both sides of which the short-circuit rings are connected as further rotational masses by means of reinforcements against torsion formed by the short-circuit rods.

In larger three-phase motors, the natural torsional frequencies that result from this oscillation system are less than 1000 Hz. If this type of machine is operated with frequency converters, the occurring harmonic waves lead to notable pendulum torques in the current. These pendulum torques act on the rotor as an outside torque and can excite it, again as an oscillatory system, to torsional oscillations. When this occurs the short-circuit rings oscillate in torsional fashion against the stack. Under unfavorable conditions, resonances result that cause unacceptably high mechanical tension on the rods, which are stressed to the point of bending, and possibly damage to the motor.

These fundamental connections ensue from, for example, the reference "ETZ-Archive", Vol. 6 (1984), issue 5, pages 165 to 172.

To realize higher natural torsional frequencies on the rotor and prevent resonance effects in that the natural rotary frequencies are higher than the excitation frequencies from the frequency converter, the connection between the stack and the short-circuit rings can, of course, be configured to be more resistant to torsion. For example, the projection of the rods beyond the stack can be shortened so that the bending length of the rods is shorter. This option is, however, limited, because a certain rod projection is necessary due to the mechanical stress on the rods at high rotary rpm in the field of centrifugal force.

SUMMARY OF THE INVENTION

It is the object of the invention to make the construction of cage rotors less sensitive to such secondary effects of frequency converters in a simple way.

This object is attained in that 2, 3 or more short-circuit rods respectively located next to one another are brought together at their ends to form rod assemblies and are connected there with material-to-material bonding to the short-circuit rings.

Advantageous embodiments for the structure of the 2-, 3- and 4-rod assemblies will become apparent from the following detailed description.

BRIEF DESCRIPTION OF THE DRAWINGS

The invention is described in detail below with reference to schematic embodiments.

Shown are in.

DESCRIPTION OF THE PREFERRED EMBODIMENT

Figure 1:
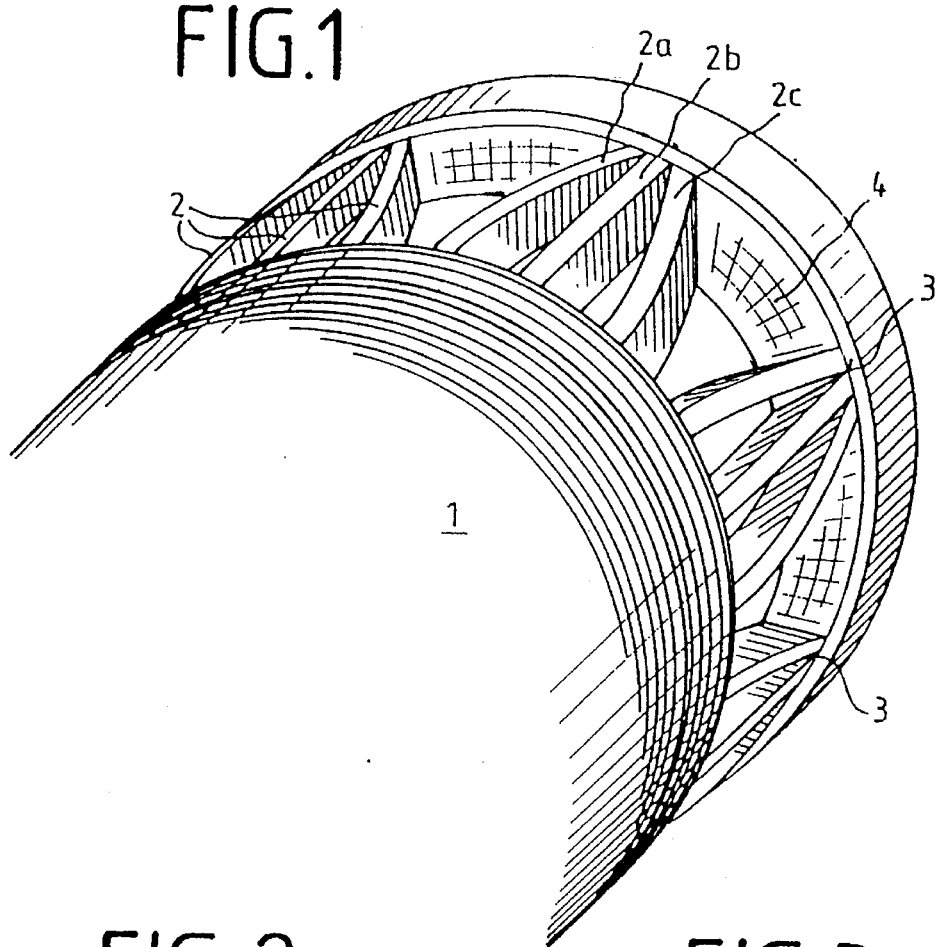
FIG. 1 partial view of a squirrel-cage rotor having three-rod assemblies
Figure 2:
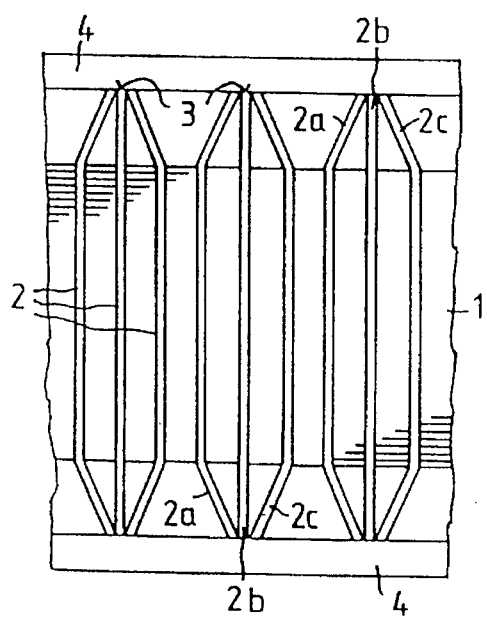
FIG. 2 schema of self-contained short-circuit rods having three-rod assemblies
Figure 3:
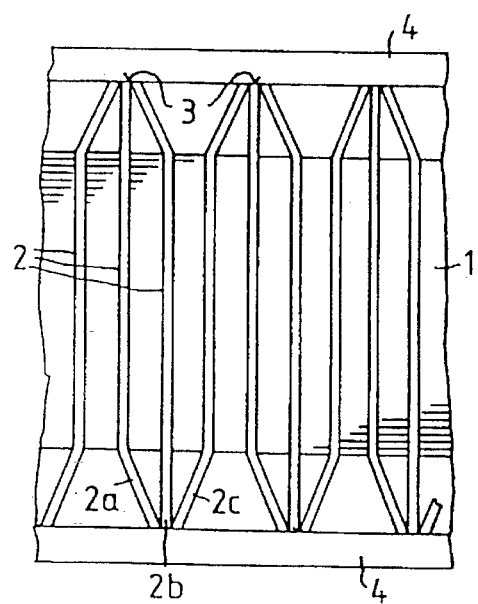
FIG. 3 schema for continuous, end-side joining with three-rod assemblies

In FIG. 1, reference numeral 1 indicates the tubular structure of a squirrel-cage rotor having layered lamina, from which short-circuit rods 2, imbedded in grooves not shown in detail, project. Respectively, three short-circuit rods 2 are joined to make one three-rod assembly, wherein. The outer short-circuit rods 2a and 2c are tangentially bent at an angle toward one another and lead to a central, straight-guided short-circuit rod 2b. At locations 3 the short-circuit rods guided together in this way are connected to short-circuit ring 4 in a rod assembly. FIG. 1 shows only the rod assemblies of the one rotor end. The other rotor end can be configured identically, or can include different short-circuit rods in accordance with FIGS. 2 and 3. In FIG. 2 the same three short-circuit rods are connected to one another at both ends of the rotor, resulting in a self-contained course. In accordance with FIG. 3, further short-circuit rods are progressively included, resulting in a progressive, meandering sort of course. Because the projecting short-circuit rods are bent in the circumferential direction, rod groups or assemblies are thus formed that have a stabilizing function similar to a latticework. The bent projecting rod is not only stressed to the point of bending with torsion of the short-circuit ring, as is the straight rod, but also with normal forces, which significantly increases the resistance in the circumferential direction.

Figure 4:
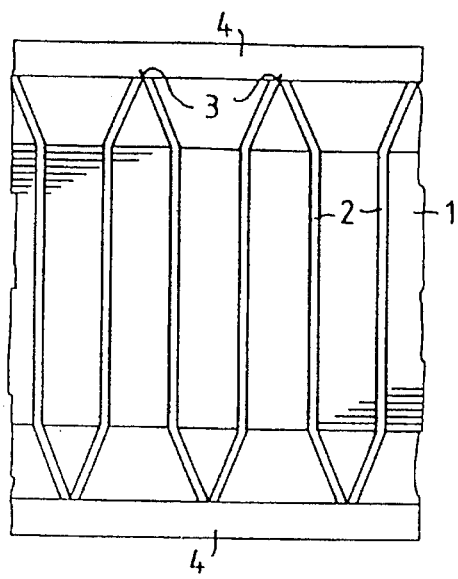
FIG. 4 schema for continuous joining with two-rod assemblies
Figure 5:
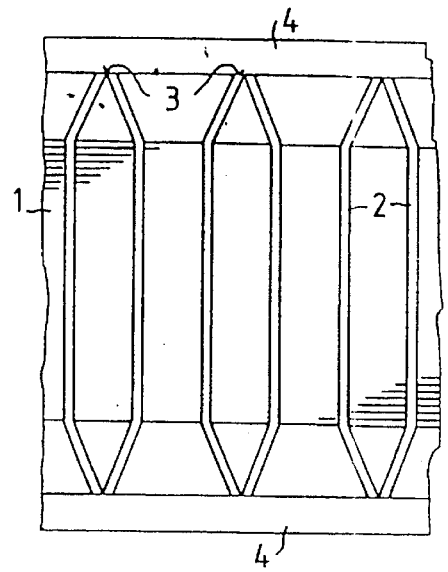
FIG. 5 schema of self-contained short-circuit rods for two-rod assemblies

FIGS. 4 and 5 show arrangements for forming two-rod assemblies with an even number of rotors 1. In FIG. 4 a symmetry of the cage with a meandering, progressive course is achieved through bending that alternates in different directions. In FIG. 5 respectively two short-circuit rods are connected as self-contained.

Figure 6:
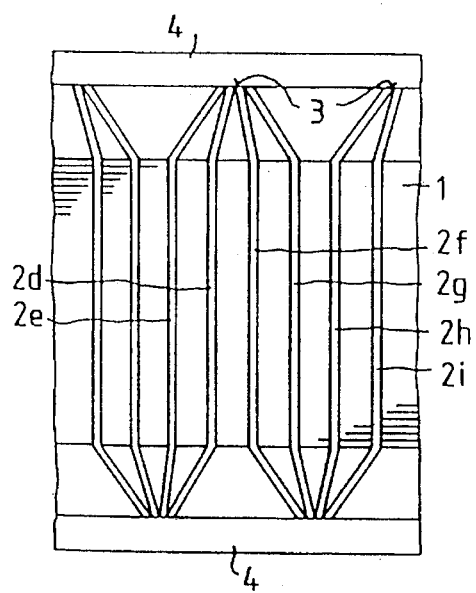
FIG. 6 schema for continuous joining with four-rod assemblies
Figure 7:
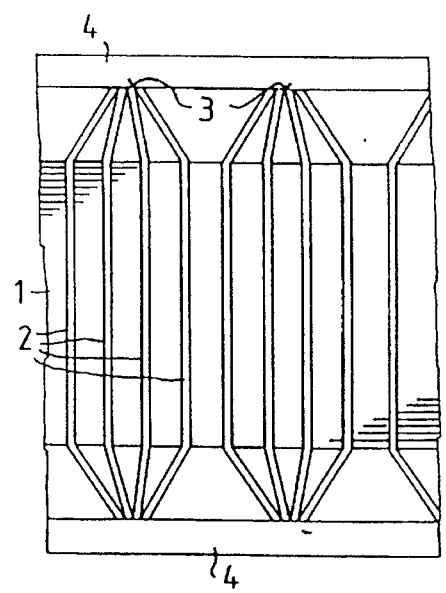
FIG. 7 schema for self-contained joining of the short-circuit rods in four-rod assemblies.

FIGS. 6 and 7 show arrangements for forming four-rod assemblies, in which respectively four short-circuit rods 2 are accommodated in a number of grooves of the rotor divisible by four. The four short-circuit rods 2 are angled off at their ends and run together there. In FIG. 7 the short-circuit rods are self-contained at both ends and form the rod assemblies. In FIG. 6 respectively two short-circuit rods 2f, 2g, which are combined with two contiguous, preceding short-circuit rods 2d, 2e at one end, here the upper end form one rod assembly, and at the other end—here the lower end—to form another rod assembly with two contiguous, following short-circuit rods 2h, 2i. This continues in alternating, analogous fashion. This configuration is particularly insusceptible to oscillation.

With the invention, an improvement in the operation of three-phase squirrel-cage rotor machines with frequency converters can be achieved by means of a simple structural embodiment.

We claim:

1. A squirrel-cage rotor for an electric machine, comprising:
   a laminated tubular structure having opposite ends;
   a short circuit ring axially spaced from one end of said laminated tubular structure; and
   a cage extending axially through said tubular structure and including:
   a plurality of electrically conductive short circuit rods each having an end projecting from the one end of said tubular structure and being bonded in a material-to-material connection to said short circuit ring, the projecting ends of at least two adjacent rods being directed together to form respective rod assemblies, wherein the projecting ends of the rod assemblies together form a junction with said short-circuit ring.

2. A squirrel-cage rotor as defined in claim 1, wherein the projecting ends of at least two rods of each said rod assembly are tangentially bent toward one another at an angle.

3. A squirrel-cage rotor as defined in claim 1, wherein each said rod assembly comprises a three rod assembly having two outer rods and a central rod, the central rod having a straight projecting end, said projecting ends of said two outer rods being bent toward one another and toward said straight projecting end.

4. A squirrel-cage rotor as defined in claim 3, wherein each said three rod assembly has two identically configured ends each projecting from a respective end of said tubular structure.

5. A squirrel-cage rotor as defined in claim 3, wherein each said rod has two ends projecting from a respective end of said tubular structure; the central rod of one three-rod assembly having a tangentially bent projecting end opposite from said straight projecting end and constituting an outer rod of a progressively further three-rod assembly.

6. A squirrel-cage rotor as defined in claim 1, wherein said tubular structure includes grooves in which said rods are embedded, each said rod has two ends each projecting from a respective end of said tubular structure, each rod assembly comprises two adjacent rods having projecting ends directed together at both ends of said tubular structure, and said rotor has an even number of rotor grooves.

7. A squirrel-cage rotor as defined in claim 2, wherein each said rod has two ends each projecting from a respective end of said tubular structure and being tangentially bent in opposite directions from one another, the ends of adjacent rods being directed toward one another at respective ends of the tubular structure to form meandering, continuous rod assemblies.

8. A squirrel-cage rotor as defined in claim 1, wherein said tubular structure includes a number, divisible by four, of rotor grooves in which said rods are embedded, and at each end of said tubular structure said rod assemblies each include four rods having their projecting ends directed together.

9. A squirrel-cage rotor as defined in claim 8, wherein the four rods of each rod assembly are directed together at each end of said tubular structure to comprise a common rod assembly.

10. A squirrel-cage rotor as defined in claim 8, wherein two contiguous rods are joined at the one end with two preceding contiguous rods to form a first rod assembly, and are joined at their opposite ends with two following contiguous rods to form a second rod assembly.

* * * * *